March 18, 1969   F. HODLER   3,433,291

VENTING OF PRESSURE MOLDING APPARATUS

Filed Aug. 8, 1966   Sheet 1 of 2

INVENTOR:
FRITZ HODLER
BY Kelman & Berman
AGENTS

3,433,291
VENTING OF PRESSURE MOLDING APPARATUS
Fritz Hodler, Ave. de Collonge 28, Territet, Switzerland
Filed Aug. 8, 1966, Ser. No. 570,956
Claims priority, application Germany, Aug. 16, 1965,
H 56,886
U.S. Cl. 164—305
Int. Cl. B22d 17/32, 17/26
16 Claims

ABSTRACT OF THE DISCLOSURE

A venting valve on the die of a diecasting machine is closed by a slender compression member when the die is filled with metal. The compression member is a flexible, laminated strip guided in a flexible tube by balls. The compression member is moved either by a hydraulic piston which responds to maximum pressure in the pressure fluid operating the injection cylinder or by an abutment on the injection piston through a linkage.

---

The present invention relates to improvements in the vent control mechanism for the die of a pressure molding apparatus.

It is known to provide pressure molding apparatus with dies which remain vented during injection of the liquid molding material into the mold cavity to facilitate escape of air and other gases from the cavity, and which are blocked by a valve when the cavity is filled in order to prevent escape of the molding material through the vent. Various means have been proposed for controlling closing of the venting valve in response to a signal generated in response to the molding material injecting means having reached a die filling end position.

The primary object of this invention is the provision of a direct mechanical power transmission between a signal generating means positioned at a distance from the die and the venting valve in a manner substantially free of inertia and independent of the arrangement of the valve on the die. Such a mechanical connection will promptly and dependably operate the valve in response to the signal while being free of drawbacks encountered in other systems. It is simple in structure and inexpensive.

With this and other objects in mind, the invention, in its major aspect, provides a mechanical connecting means fixedly connecting the signal generating means, which is arranged adjacent the injection mechanism and remote from the die to generate an operating signal in response to the injecting means having reached the die filling end position, and a movable valve element for moving the element of the venting valve when the operating signal is generated, and thus to close the valve. In the embodiments illustrated herein and described hereinafter, this mechanical connecting means consists of a known mechanical power transmission consisting of a flexible tube which houses a flexible compression member and anti-friction elements movably guiding the compression member in the tube. The compression member fixedly connects the signal generating means and the movable venting valve element.

A flexible compression member of this type may be damaged if subjected to stresses due to excessive acceleration or braking forces exerted by the movable valve element. This drawback is avoided in accordance with a preferred embodiment of this invention by mounting a piston for axial reciprocation in the valve chamber and by arranging a radially extending inlet port in the valve housing, which connects the vent conduit of the die and the valve chamber, and the piston is reciprocable past the orifice of the inlet port to block the vent conduit without hitting against a valve seat. Thus, the sliding movement of the valve piston is gradual and never involves sudden acceleration or stopping whereby damage to the sensitive flexible laminate constituting the compression member is avoided. This effect is further increased according to another preferred feature by making the dimension of the inlet port orifice considerably smaller in the direction of the piston stroke than perpendicularly thereto. This enables the piston stroke to be quite short and reduces the maximum acceleration of the piston and the compression member fixedly attached thereto.

Other features and many of the attendant advantages of this invention will be readily appreciated as the same becomes better understood by reference to the following detailed description of preferred embodiments when considered in connection with the accompanying drawings wherein—

Figure 1:
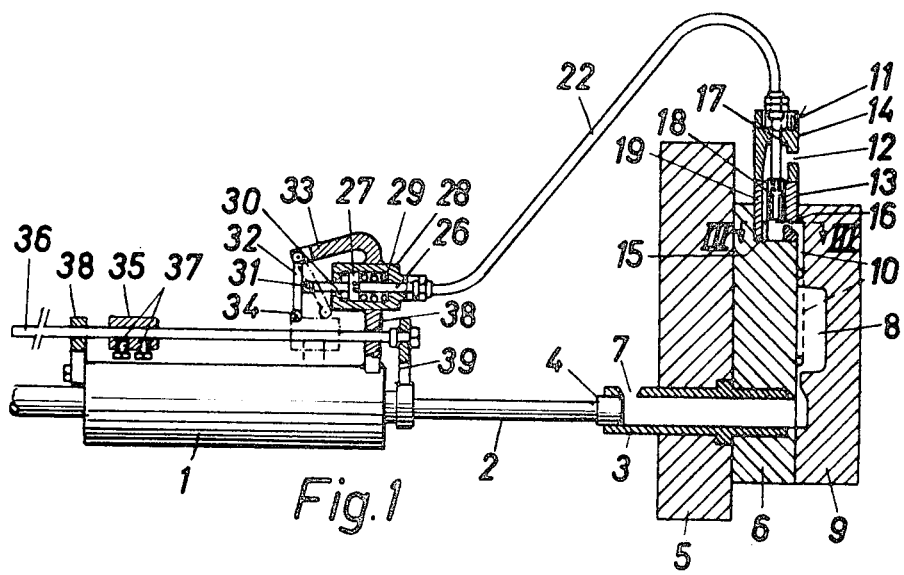
FIG. 1 illustrates the injection means of a cold-chamber diecasting machine and a die vent control mechanism according to one embodiment of the present invention, the view being partly in elevational section.

Referring now to the drawing in detail, and initially to FIG. 1, there is shown the injecting means for forcing a liquid metal into the mold cavity 8 of the die, the illustrated injecting means comprising a pressure fluid cylinder 1 wherein a piston rod 2 carrying a plunger 4 is reciprocably mounted.

The plunger moves in injection cylinder 3 which is carried by, and extends through bores in, die support plate 5 forming part of the pressure molding apparatus and the stationary half 6 of the die. The pressure fluid cylinder 1 may have one cylinder chamber connected to a pressure fluid conduit 43 receiving fluid under pressure, such as hydraulic fluid or pressurized air, from a source (not shown), the piston rod 2 being movable by this pressure fluid operated means (see FIG. 6).

When it is desired to mold a molding material, such as liquid metal, the chamber of injection cylinder 3 is filled with the liquid molding material through feed opening 7 and the pressure fluid operated means is actuated to force the liquid material into mold cavity 8, the plunger 4 being moved from a starting position (illustrated in FIGS. 1 and 6) to a die filling end position while the pressure in conduit 43 increases due to the back pressure of the liquid molding material to a maximum value in the end position of the plunger when the molding material fills the mold cavity defined between stationary die half 6 and movable die half 9. A vent conduit 10, which may consist of a plurality of channels, leads from the mold cavity to a safety or air escape valve means 11. While the mold cavity is filled with the molding material, the valve means is open to permit air and other gases to be vented from the die.

The illustrated valve means is a slide valve with a cylindrical valve housing mounted on the die and defining a valve chamber. A movable valve means element constituted by slidable piston 18 in the illustrated embodiment is mounted in the valve housing for movement into and out of a position blocking the vent conduit 10. The valve housing defines a radially extending inlet port 16 connecting vent conduit 10 and the valve chamber, and the piston 18 is reciprocable from the open position shown in FIGS. 1 and 6 past the inlet port to close the same and to block the vent conduit 10, i.e. to cut communication between the inlet port 16 and venting port 12 whence air and other gases may escape from the mold cavity when piston 18 is removed from the inlet port. The air and other gases may be permitted to escape from the venting port into the atmosphere or, if desired, they may be sucked away by a vacuum pump (not shown).

Figures 2, 3:
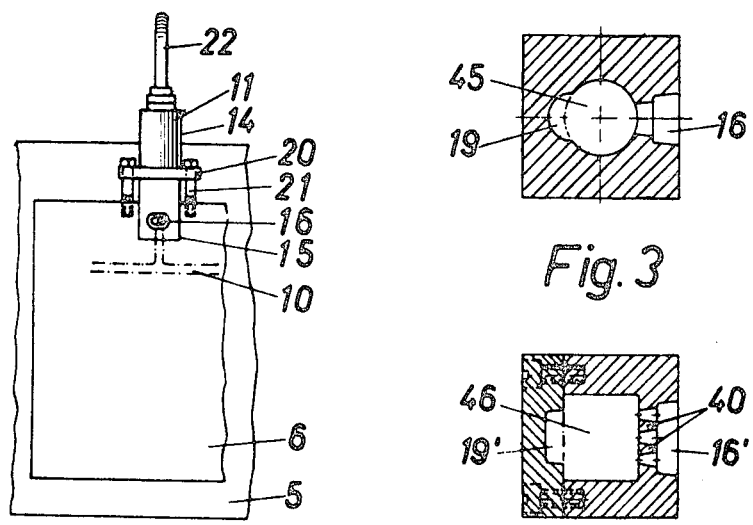
FIG. 2 is a front elevational view of one half of the die and of the safety valve of the die vent control mechanism, with the other die half removed.
FIG. 3 is a section along line III—III of FIG. 1, in an enlarged view.
Figure 4:
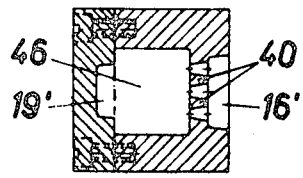
FIG. 4 shows a sectional view similar to that of FIG. 3 of a modified safety valve.
Figure 5:
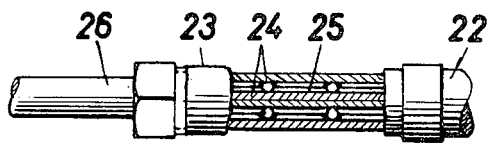
FIG. 5 is an enlarged view, partly in section, of the mechanical connecting means used in the invention, the view being taken at one end of the connecting means.

The preferred embodiment of the safety valve illustrated herein comprises a two-part valve housing, the lower valve housing part 13 being a cylindrical block which is removably mounted by a press fit in a recess 15 of the die half 6. The upper housing part 14 carries the piston 18 whose piston rod 17 is slidably journaled in an end wall of the upper valve housing part for reciprocation of piston 18 in the valve housing chamber. The inlet port 16 of the valve is arranged in lower valve housing part 13 and, upon reciprocation, the piston will open and close the inlet port. As shown in FIGS. 3 and 4, the inlet port 16 and the venting port 12 of the valve means 11 are in communication by means of a connecting channel 19 or 19' forming a recess in the wall of the lower valve housing part 13.

Figure 6:
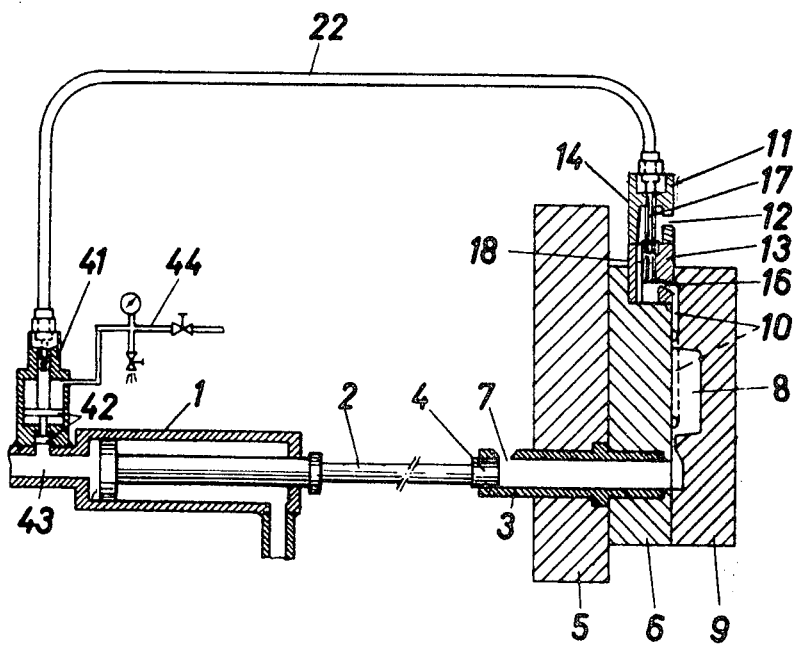
FIG. 6 is a view similar to that of FIG. 1 of another embodiment.

As shown in FIGS. 1 and 6, the two die halves 6, 9, which are movable relative to each other in a manner well known per se and, therefore, not shown, face each other in the closed position along a common plane of separation, and the valve housing inlet port 16 communicates with vent conduit 10 in this plane. Also, in the preferred embodiments illustrated herein, the inlet port is a bore in the valve housing with a dimension in the direction of reciprocation of piston 18 substantially smaller than in a direction perpendicular thereto.

As best shown in FIG. 2, a preferred mounting means for the valve on the die includes an annular flange 20 carried by upper valve housing part 14 and fastening means connecting the flange to the die half 6 and thus fixing the part 14 to the die. The illustrated fastening means is constituted by threaded bolts 21. The lower valve housing part 13 is positioned between die half 6 and the upper valve housing part 14 and is press fit into the recess 15 of die half 6 when the bolts 21 are driven home.

As shown in FIG. 3, the valve housing inlet port 16 is tapered in the direction of the vent conduit toward the valve chamber 45. In the preferred embodiment shown in FIG. 4, a screening means constituted by a plurality of webs 40 is built into the inlet port 16' leading to the valve chamber 46 to prevent molding material particles from penetrating into the valve chamber.

The preferred mechanical connecting means fixedly connecting a signal generating means for operating the venting valve 11 and the slidable valve piston 18, and which moves the valve piston when the signal is generated, is a known type of flexible mechanical power transmission 22, sold under the name of "Flexball." This mechanical power transmission consists of a flexible tube 23 which houses a flexible compression member 25 constituted by a laminate of flexible strips. The compression member further includes anti-friction elements illustrated as balls 24 for movably guiding the compression member in the tube. The flexible tube 23 is attached at its respective ends to the valve housing of valve 11 and to cylinder 28 (FIG. 1) or 41 (FIG. 6) of the signal generating means to be described hereinafter. The compression member 24, 25 is fixedly connected at its respective ends to piston rod 17 of the valve piston and to a movable mechanism of the signal generating means.

In the embodiment of FIG. 1, the signal generating means comprises an abutment lug 35 fixedly connected to, and movable in unison with, the molding material injecting means 2, 4, and a movable mechanism 26-34 which is moved by the lug when the lug is moved into contact with this mechanism. The illustrated movable mechanism comprises a movable element constituted by piston 27 and piston rod 26 slidable in cylinder 28, the piston rod 26 being fixedly connected to the compression member 25 of the mechanical connecting means. A return spring 29 is mounted in cylinder 28 and bears against piston 28, the return spring being biased normally to hold the movable element 26, 27 in a position wherein the valve piston 18 is held by the compression member in the position out of blocking the vent conduit, i.e. the valve is normally open to permit the die mold cavity to be vented. The movable mechanism of the signal generating means further comprises a linkage means between movable element 26, 27 and lug 35 for moving the movable element against the spring bias when the lug engages the linkage means and thereby to move the thrust member and the valve piston into the position blocking the vent conduit, i.e. to close the valve. This linkage means is illustrated as including a push rod 30 extending from piston 27, and a pivotal arm 32 pivotally mounted on fixed bracket arm 33 and engaged by the outer end of the push rod. A ball-bearing mounted roller 31 is arranged on the outer end of the push rod and a similar roller 34 is arranged on the outer end of the pivotal arm so that there is friction-free engagement between the push rod and the pivotal arm, as well as the pivotal arm and lug 35.

As shown, lug 35 is adjustably mounted on a guide rod 36 by means of set screws 37, the guide rod being fixedly connected to the piston rod 2 of the injecting mechanism by means of an entrainment piece 39 for reciprocating movement in unison therewith. The guide rod is journaled in fixed bearing brackets 38, 38 mounted on cylinder 1. The adjustable mounting of lug 35 enables the same to be so positioned on guide rod 36 that the lug will engage pivotal arm 32 just before or at the moment when mold cavity 8 is completely filled with the liquid molding material, and thus close valve 11. In this manner, splattering of liquid molding material through vent conduit 10 and venting port 12 is prevented. After the mold cavity has been filled and the molded article has been removed from the die, piston 4 is returned to the illustrated starting position, entraining guide rod 36 and lug 35 in unison with the piston movement and thus permitting return spring 29 to move the thrust member back into the position which moves the valve piston 18 into the position which opens the valve. The apparatus is now ready for the next molding operation.

The direct mechanical connection between the valve operating signal and the valve closing element makes it possible to close the valve automatically and accurately at the exact time when the mold cavity is completely filled. If the quantity and density of the molding material in the injection cylinder 3 varies, the lug 35 is accordingly adjusted on the guide rod.

The illustrated two-part construction of the valve housing facilitates replacement of the die since the lower valve housing part 13 may remain on the die, and the upper valve housing part 14 may be readily removed by unscrewing bolts 21, and may then be placed on the lower valve housing part of another die. If some liquid molding material accidentally enters the valve chamber, it may be cleaned easily by lifting the lower valve housing part out of recess 15.

As shown in FIG. 2, the hereinabove described shape of inlet port 16, whose dimension in the direction of the piston stroke is much smaller than in a direction perpendicular thereto, makes it possible to operate with a very short valve piston stroke, thus considerably reducing the acceleration and braking forces to which the compression member 25 is subjected, and practically eliminating any danger of damage to this member due to excessive stresses. Such stresses are further prevented in the illustrated construction of the valve by the fact that the valve piston does not hit against a valve seat upon closing of the valve and thus is not abruptly stopped at the end of the closing movement.

As shown in FIGS. 3 and 4, the valve chamber may be of circular or polygonal, for instance, quadratic, cross section, the latter embodiment being particularly useful to permit large amounts of gas to be vented with a small piston stroke because it permits the width of the inlet port to be rather large. The screening means 40 in the inlet port 16' has the advantage of preventing molding material particles from passing into the valve chamber in cases of particularly high molding pressures or other unfavorable molding conditions.

The embodiment of FIG. 6 differs from that of FIG. 1 only in the signal generating means, all like reference numerals designating like parts operating in a like manner and, therefore, not described again. The signal generating means shown in FIG. 6 comprises a cylinder 41 defining a chamber in communication with the pressure fluid conduit 43 forming part of a conventional pressure fluid operated means for moving the plunger 4 into and out of the die filling end position. The pressure in conduit 43 increases to a maximum value in the plunger end position when the liquid molding material fills the mold cavity 8. A movable element constituted by double piston 42 is mounted in cylinder 41 for movement under the influence of the pressure in conduit 43 when the same has reached the maximum value. The piston rod of the double piston is fixedly connected to one end of compression member 25 in a manner similar to that of piston rod 26 in the embodiment of FIG. 1 so that the movement of the double piston 42 operates the valve 11 in the same manner as that of piston 27 in FIG. 1. In this embodiment of the signal generating means, the return spring 29 of FIG. 1 is replaced by a supply line 44 for pressurized air connected to the chamber of cylinder 41 for returning the double piston 42 to the normal position. This enables the valve to be closed without regard to the molding material quantity and any changes therein at any desired moment, the air supply to the one chamber of cylinder 41 being balanced against the pressure exerted against double piston 42 from conduit 43 so as to move the piston at any desired moment.

Obviously, the illustrated movable mechanisms of the signal generating means for controlling the safety valve 11 may be replaced by any suitable means responsive to the die filling movement of the molding material injecting means. For instance, the one end of the compression member 25 may be subjected to pressure fluid, such as pressurized air or hydraulic fluid, from a special source supplying this pressure fluid in response to a given position of the plunger 4. The signal generating means may also be solenoid-controlled and the movable element of the solenoid would then be fixedly connected to the one compression member end. These and other modifications and variations of the present invention are possible in the light of the above teaching. It is, therefore, understood that, within the scope of the appended claims, the invention may be practiced otherwise than specifically described.

What I claim is:

1. A pressure molding apparatus comprising, in combination
    (a) a die defining a mold cavity and a vent conduit communicating with said cavity;
    (b) injecting means for forcing a liquid molding material into said cavity, said injecting means being movable between a starting position and a die-filling end position;
    (c) signal generating means remote from said die for generating an operating signal in response to the injecting means having reached said end position;
    (d) valve means communicating with said vent conduit for blocking the same in response to said operating signal,
        (1) said valve means including a valve element movable into and out of a position in which the valve element blocks said conduit; and
    (e) mechanical connecting means interposed between said signal generating means and said valve element for transmitting said signal, said connecting means including
        (1) an elongated flexible tube,
        (2) an elongated flexible compression member having two end portions and a portion intermediate said end portions, said intermediate portion being received in said tube, and
        (3) a plurality of anti-friction elements in said tube in guiding engagement with said intermediate portion,
        (4) said end portions being fixedly fastened to said signal generating means and to said valve element respectively.

2. A pressure molding apparatus as set forth in claim 1, wherein said valve means includes a valve housing defining a valve chamber and formed with an inlet port communicating with said vent conduit, said inlet port having an orifice opening into said chamber in a predetermined direction, said valve element being received in said chamber and being moved by said compression chamber transversely of said predetermined direction past said orifice for blocking the same.

3. A pressure molding apparatus as set forth in claim 2, wherein said die has two halves movable relative to each other toward and away from a closed position, the die halves in the closed position facing each other along a common plane of separation, the valve means being mounted on one of said die halves, and the valve housing inlet port communicating with the vent conduit in said plane of separation.

4. A pressure molding apparatus as set forth in claim 2, wherein the valve housing consists of two parts, a lower one of the valve housing parts being removably mounted on the die, and an upper one of the valve housing parts being removably mounted on the lower valve housing part, the valve element being carried by the upper valve housing part, and the inlet port being arranged in the lower valve housing part.

5. A pressure molding apparatus as set forth in claim 2, further comprising a screening means in said valve housing inlet port for preventing molding material particles from penetrating into the valve chamber.

6. A pressure molding apparatus as set forth in claim 2, wherein the valve housing inlet port is tapered in a direction from the vent conduit toward the valve chamber.

7. A pressure molding apparatus as set forth in claim 2, wherein the dimension of said orifice in the direction of movement of said valve element is substantially smaller than the dimension perpendicular to said direction of movement.

8. A pressure molding apparatus as set forth in claim 1, wherein said signal generating means include abutment means fixedly connected to said injecting means for movement therewith, and motion transmitting means operatively connected to said compression member and engageable by said abutment means during movement of said injecting means for moving said compression member.

9. A pressure molding apparatus as set forth in claim 8, wherein the injecting means comprises a piston rod carrying a plunger, and further comprising a guide rod fixedly connected to said piston rod for reciprocating movement in unison therewith, said abutment means being adjustably mounted on said guide rod.

10. A pressure molding apparatus as set forth in claim 8, wherein said motion transmitting means include return spring means biasing one end portion of said compression member to hold said valve element out of said position of the latter, and linkage means engageable with said abutment means and with said one end portion for moving said compression member against the biasing of said spring means.

11. A pressure molding apparatus as set forth in claim 10, wherein said linkage means comprises a pivotal arm engageable by said abutment means being moved in unison with said injecting means into the die filling end position.

12. A pressure molding apparatus as set forth in claim 11, further comprising a roller mounted on an outer end of said pivotal arm for engagement with said abutment means.

13. A pressure molding apparatus as set forth in claim 11, wherein said linkage means further comprises a cylinder, a piston reciprocable in said cylinder, said return spring means being mounted in said cylinder in engagement with said piston, and a push rod extending from said piston and having two ends respectively adjacent said pivotal arm and said one end portion.

14. A pressure molding apparatus as set forth in claim 1, further comprising pressure fluid operated means for moving said injecting means into and out of the die filling end position, said pressure fluid operated means including a pressure fluid conduit, and the pressure in said conduit increasing to a maximum value in said end position when said liquid molding material fills said mold cavity, and said signal generating means comprises a movable element mounted for movement under the influence of said pressure when the same has reached said maximum value, said movable element being fixedly connected to said compression member.

15. A pressure molding apparatus as set forth in claim 14, further comprising a cylinder defining a chamber in communication with the pressure fluid conduit, said movable element being a piston movable in said cylinder from a normal position under the influence of said pressure, and a piston rod extending from said piston and fixedly connected to said compression member.

16. A pressure molding apparatus as set forth in claim 15, further comprising means for returning the movable piston to said normal position in said cylinder.

References Cited

UNITED STATES PATENTS

| | | | |
|---|---|---|---|
| 2,867,869 | 1/1959 | Hodler | 164—305 |
| 2,914,822 | 12/1959 | Nyselius | 164—305 |
| 2,958,104 | 11/1960 | Ohse | 164—305 |
| 3,056,178 | 10/1962 | Jagielski | 164—305 |

FOREIGN PATENTS

| | | |
|---|---|---|
| 544,141 | 7/1957 | Canada. |
| 1,008,610 | 10/1965 | Great Britain. |

WILBUR L. McBAY, *Primary Examiner.*

U.S. Cl. X.R.

18—30